(No Model.) 2 Sheets—Sheet 1.

J. C. McLACHLAN.
HARVESTER.

No. 357,616. Patented Feb. 15, 1887.

WITNESSES
W. Webb
R. Beech

INVENTOR
John C. McLachlan
per atty
Henry Beech (No Model.)  2 Sheets—Sheet 2.

J. C. McLACHLAN.
HARVESTER.

No. 357,616.  Patented Feb. 15, 1887.

WITNESSES  INVENTOR

UNITED STATES PATENT OFFICE.

JOHN C. McLACHLAN, OF LONDON, ONTARIO, CANADA, ASSIGNOR TO THE JOHNSTON HARVESTER COMPANY, OF BATAVIA, NEW YORK.

HARVESTER.

SPECIFICATION forming part of Letters Patent No. 357,616, dated February 15, 1887.

Application filed November 6, 1885. Serial No. 182,059. (No model.) Patented in Canada September 1, 1885, No. 22,326.

*To all whom it may concern:*

Be it known that I, JOHN C. MCLACHLAN, a subject of the Queen of Great Britain, and a resident of London, in the county of Middlesex and Province of Ontario, Dominion of Canada, have invented certain new and useful Improvements in Self-Binding Harvesters; and I do hereby declare that the following is a full, clear, and exact description of the invention, such as will enable others skilled in the art to which it appertains to make and use the same.

My invention relates to improvements in that class of self-binding harvesters in which the cut grain is moved longitudinally upon the platform, and therefrom delivered to an elevating mechanism and carried thereby to the binding apparatus, located upon the machine outside of the main driving-wheel; and the object of my improvement is to provide a platform-tilting mechanism operated by the rotation of a crank-shaft carrying a bevel-pinion, which is made to engage with a corresponding segment of a bevel-wheel attached to the rear end of the tongue of the machine and operated by the driver when seated upon the machine.

Figure 1:
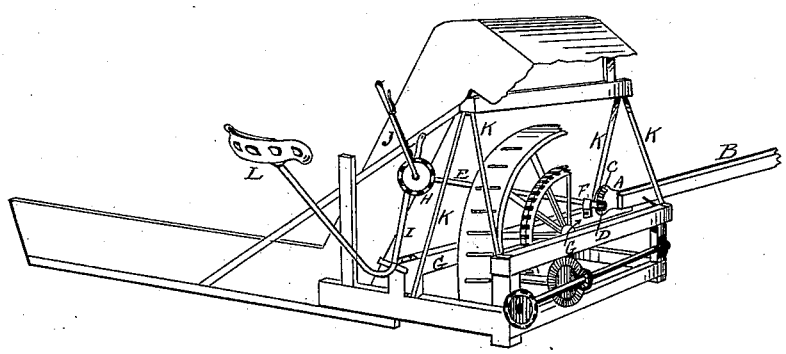
Figure 3:
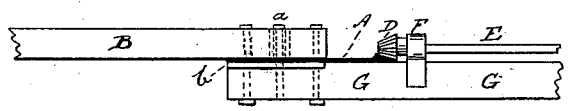
Figure 2:
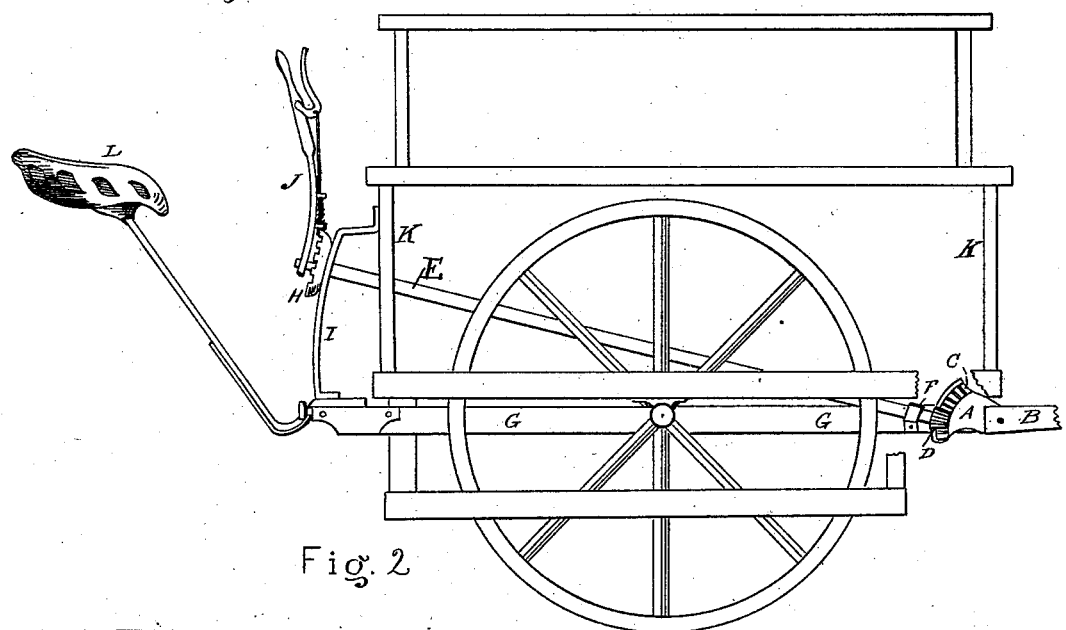
Figure 4:
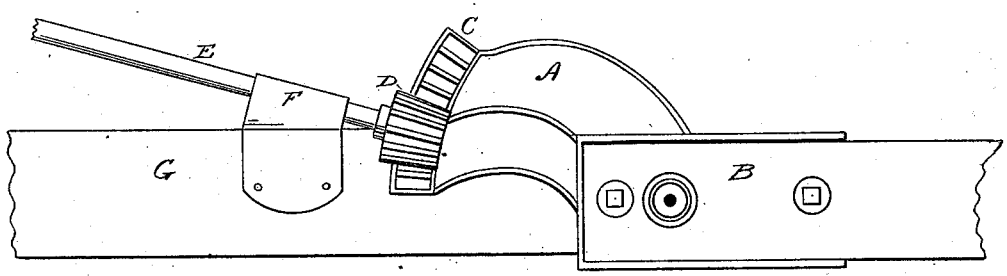
Figure 5:
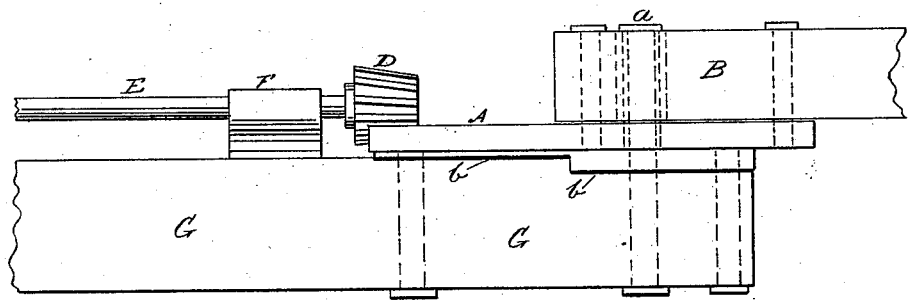

In the accompanying drawings of my invention, Figure 1 is a perspective view; Fig. 2, an elevation at side. Fig. 3 is a detail of tongue, sill, and tilt-rod. Figs. 4 and 5 are also details of segment, tilt-rods, tongue, sill, &c., on an enlarged scale.

Similar letters refer to similar parts throughout the several views.

As the improvement consists more particularly in the mechanism for tilting the platform upon its two supporting-wheels for picking up the lodged or short grain that may be interspersed throughout the field having a heavy stand of crop, it will only be necessary to show and describe the parts of a harvester to which the improvement is applicable and only those parts adjacent to and coacting with the said tilting mechanism.

To this end, therefore, A represents a metallic plate attached to and forming a rear extension of the tongue B. This plate forms a part of a segment of a beveled gear-wheel axially centered upon a securing-bolt, $a$, which not only passes through the segment but also the rear end of the tongue and the cross-beam G, forming a part of the harvester-frame. By this bolt-connection the tongue (when not locked in the rigid position) is allowed a vertical play upon the bolt; but as the bolt passes upon a horizontal line through the tongue and beam, which are parallel each with the other, there can be no lateral displacement of the tongue and the segmental extension. If desired, a counterpart of the beam G may be placed upon the opposite side of the tongue, the hinging-bolt extending through the whole.

D is a beveled pinion secured to the forward end of the rod E, and having upon its periphery teeth corresponding with the teeth C upon the segment A, and into which the said pinion meshes.

F is a bearing-box secured to the cross-bar G, within which the rod E is journaled at its forward end, while the rear end of the said rod passes through the box H, secured to a brace-bar, designated I. This bearing-box H is made circular in form and of some considerable diameter and provided upon its periphery with rack-detents, which engage with the ordinary spring-bolt located upon the hand-lever J, the lower end of which is firmly secured to the end of that part of the rod E extending rearwardly through the bearing-box, so as to form a crank-arm for the turning of the rod and its attached pinion, for a purpose hereinafter explained.

L represents the driver's seat secured to the usual supporting-standard, and, as herein shown, is located at the extreme rear part of the machine; but I do not wish to confine myself to this specific location, as it is only necessary to have the driver placed in a position contiguous to the lever J, so that the same can be operated by the attendant while in the sitting posture and in his seat upon the rear part of the machine.

K are brace-rods for supporting the elevator-frame; but in lieu of these rods any well-known support may be used.

The rod E, as herein shown, extends back under the elevator-frame, and the crank thereon is thus brought within reach of the driver's seat mounted on the rear bar of the frame, and should the seat be raised or lowered the rod may be given a corresponding inclination; or, if desired, the seat may be located above the free end of the lever J or at one side thereof, or at any convenient point upon the rear part of the machine, so that the lever may be used as a crank-arm for causing the revolution or part revolution of the same, and therewith the pinion, and by the hand of the operator while in his seat upon the machine, as hereinbefore mentioned.

It will be seen that by having the machine supported upon two bearing-wheels, one upon either end, the front end of the tongue being held in a fixed vertical position, with the joint connection between the two, by turning the rod, and with it the pinion, the angle of incidence between the tongue and platform is quickly changed, thereby varying the horizontality of the platform. By allowing the same to rock upon the said bearing-wheels, the cutters will be brought near the ground, so that tangled or low-down grain may be picked up without giving a bodily vertical movement to the platform, with the loss of time incident thereto.

By having teeth upon the entire periphery of the pinion several revolutions may, if necessary, be given the pinion, thus allowing of a much larger range of work than can be obtained through the instrumentality of a reciprocatory movement of the lever usually employed as a medium for tilting the platform.

The spring-bolt can be made to engage with any of the notches upon the periphery of the bearing-box H and the angle of the platform retained in any desired position.

Having now described my invention, what I claim as new, and desire to secure by Letters Patent, is—

1. In a grain-binding harvester having an elevating-canvas and a rigid frame mounted upon two carrying-wheels, the combination of the hinged tongue provided with the rear segmental gear having beveled teeth upon the lateral face of the segment, the bevel-pinion having teeth corresponding with the segmental teeth and meshing therein, the pinions secured to the revolving shaft and turning therewith, and the shaft mounted in bearings attached to the harvester-frame and extending rearwardly underneath the elevator-frame, the crank-arm thereupon, by which the shaft is revolved in the act of tilting the platform, being within reach of the driver in his seat mounted upon the rear bar of the frame, substantially as described.

2. The combination, in a grain-binding harvester having an elevating-canvas, of the tongue carrying the segmental gear with teeth upon the lateral face, and the bevel-pinion meshing with the segmental teeth, secured to the revolving shaft mounted in bearings attached to the harvester-frame, the said shaft extending back under the elevator-frame, the crank-arm thereupon being provided with the spring-retaining bolt which coacts with the circular detent-rack and capable of being operated by the driver in his seat mounted upon the rear bar of the frame, substantially as described.

JOHN C. McLACHLAN. [L. S.]

Witnesses:
HENRY BEECH,
T. T. MACBETH.